(12) United States Patent
Saito

(10) Patent No.: US 7,639,820 B2
(45) Date of Patent: Dec. 29, 2009

(54) IMAGE FORMING APPARATUS CERTIFICATE SHEET MAKING METHOD AND CERTIFICATE SHEET PROCESSING METHOD

(75) Inventor: Shinichi Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 809 days.

(21) Appl. No.: 11/222,124

(22) Filed: Sep. 8, 2005

(65) Prior Publication Data
US 2006/0198526 A1    Sep. 7, 2006

(30) Foreign Application Priority Data
Mar. 2, 2005    (JP)    ............... 2005-057973

(51) Int. Cl.
*H04K 1/00*    (2006.01)
*H04L 9/00*    (2006.01)
*G06F 7/04*    (2006.01)

(52) U.S. Cl. .................. 380/287; 380/245; 380/246; 713/155; 713/156; 713/157; 713/158; 726/27; 726/28; 726/29; 726/30

(58) Field of Classification Search .................. 380/287
See application file for complete search history.

(56) References Cited

U.S. PATENT DOCUMENTS
2005/0172845 A1 *   8/2005   Umehara et al. ............. 101/477

FOREIGN PATENT DOCUMENTS
| JP | 2004102562 | 4/2004 |
| JP | 2004112644 | 4/2004 |
| JP | 2004-147019 | * 5/2004 |
| JP | 2004147019 | 5/2004 |
| JP | 2004151833 | 5/2004 |

\* cited by examiner

*Primary Examiner*—Longbit Chai
(74) *Attorney, Agent, or Firm*—Gauthier & Connors LLP (57) ABSTRACT

An image forming apparatus has a micropattern reading unit, an encoded image generating unit and a code printing control unit. The micropattern reading unit reads a micropattern of a sheet. The encoded image generating unit generates an encoded image. The encoded image has the micropattern and a private key of a user. The code printing control unit prints the encoded image on the sheet to produce a certificate sheet.

20 Claims, 5 Drawing Sheets

IMAGE FORMING APPARATUS CERTIFICATE SHEET MAKING METHOD AND CERTIFICATE SHEET PROCESSING METHOD

PRIORITY INFORMATION

This application claims priority to Japanese Patent Application No. 2005-057973, filed Mar. 2, 2005, which is incorporated herein by reference in its entirety.

BACKGROUND OF THE INVENTION

1. Field of the Invention

The present invention relates to an image forming apparatus such as a digital copying machine, a multifunction machine, and a printer, and more particularly to use of public key infrastructure (PKI) in an imaging forming apparatus.

2. Description of Related Art

In public key infrastructure, a private key of a user is very important to the user and must therefore be managed strictly. A private key is commonly installed in a personal computer or in an IC card.

In recent years, use of the public key infrastructure technology in image forming apparatuses such as a printer has also been proposed and promoted. Because it is often the case that an image forming apparatus is shared by a great number of people in an office or other circumstances, configurations in which each user carries their private key or the like by means of an IC card, which is to be set in a card reader attached to the imaging forming apparatus in order to use the image forming apparatus, have been considered.

However, providing an IC card reader to an image forming apparatus represents a considerable expense. Accordingly, there has been strong demand for a structure which enables each user to use their private key in an image forming apparatus in a less expensive manner.

Japanese Patent Laid-Open Publication No. 2004-147019 discloses a system in which an applicant receives, via facsimile, a certificate sheet having bar code data indicating a key pair (a private key and a public key) and the content of a public key certificate printed thereon from a server, and the recipient then uses the private key on the certificate sheet or the like to perform a process such as digital signing or the like.

A system in which a private key, a public key, or the like are printed on a sheet as disclosed in Japanese Patent Laid-Open Publication No. 2004-147019 is advantageous in that, because the system does not require a device for reading IC cards, an image forming apparatus, which is essentially provided with a printing function and a document reading function, requires substantially no additional hardware in order.

This system, however, has a risk that a certificate sheet having the private key or the like printed thereon is more easily copied and the key is used in an unauthorized manner.

SUMMARY OF THE INVENTION

The present invention provides an advantage that convenience of using a sheet as a medium which stores information of a private key and inhibition of copy of such a sheet for the purpose of an unauthorized use can be achieved simultaneously.

In accordance with one aspect, the present invention provides an image forming apparatus including a print unit which performs printing with respect to a sheet, comprising a micropattern reading unit that reads a micropattern of a sheet, an encoded image generating unit that generates an encoded image having the micropattern and a private key of a user, and a code printing control unit that supplies the encoded image and prints the encoded image on the sheet to thereby produce a certificate sheet.

In accordance with another aspect, the present invention provides an image forming apparatus comprising an encoded image analyzing unit that reads and analyzes an encoded image printed on a certificate sheet to obtain a micropattern and a private key of a user represented by the encoded image, an micropattern reading unit that reads the certificate sheet to obtain an micropattern of the certificate sheet, and a key use control unit that compares the micropattern obtained by the encoded image analyzing unit from the encoded image with the micropattern of the certificate sheet which is read by the micropattern reading unit, whereby use of a private key obtained from the encoded image is prohibited when the micropatterns are not identical and use of a private key obtained from the encoded image is permitted when the micropatterns are identical.

BRIEF DESCRIPTION OF THE DRAWINGS

Embodiments of the present invention will be described in detail based on the following figures, wherein.

EMBODIMENT OF THE INVENTION

An embodiment of the present invention will be described in detail with reference to the accompanying drawings.

Figure 1:
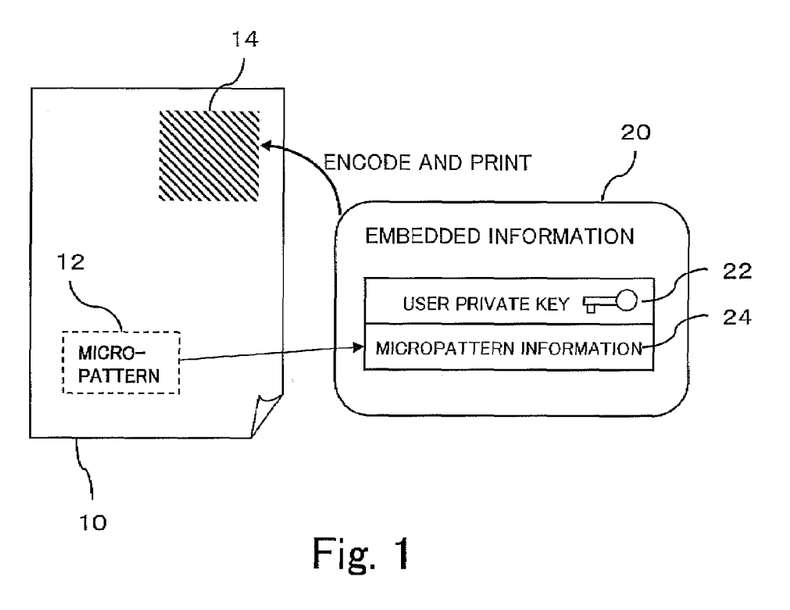
FIG. 1 is a view for explaining a system according to an exemplary embodiment of the present invention.

In FIG. 1, an embodiment of the present invention will be described. In Japanese Patent Laid-Open Publication No. 2004-147019, a sheet having an encoded image of a private key printed thereon is used as a certificate sheet. In the present embodiment, on the contrary, embedded information 20 which includes, in addition to a private key 22, micropattern information 24 indicative of a a micropattern 12 of a sheet surface is encoded. A sheet having an encoded image 14 generated by the encoded embedded information 20 printed thereon is used as a certificate sheet 10.

The micropattern of a sheet surface refers to a microscopic pattern inherent to a sheet, which is generated during a paper making process. Examples of such a "micropattern of a sheet" include, for example, a fiber pattern of a sheet disclosed by the present applicant in Japanese Patent Laid-Open Publication Nos. 2004-102562 and 2004-112644 and a surface state (such as microscopic asperities on a sheet surface), an unevenness of the paper thickness, and so on, disclosed also by the present applicant in Japanese Patent Laid-Open Publication No. 2004-151833. As disclosed in these documents, the micropattern varies significantly depending on random factors generated during the paper making process. As such, it is very difficult to duplicate a sheet having the same micropattern thereon. Here, such a micropattern is generally observed not only in paper made of pulp, but also in other sheet-like materials produced by processing fiber in a manner similar to the paper making process, such as synthetic fiber paper and non-woven fabric. Accordingly, a sheet is also not limited to pulp paper, and refers generally to sheet-like materials on which a fingerprint or micropattern as defined above can be generated.

The micropattern 12 is unique to an individual sheet. Consequently, if the certificate sheet 10 is duplicated by a copy machine to reproduce a copy, the actual micropattern 12 of the copied sheet is not identical to the micropattern information 24 which is encoded in the encoded image 14 printed on the copied sheet. According to the present embodiment, such a feature is utilized to determine whether the certificate sheet 10 which is input in the apparatus is an original or a copy, and, when the input certificate sheet 10 is determined to be a copy, execution of a PKI application is inhibited. With this structure, use of a duplicated certificate sheet 10 can be inhibited.

However, even a micropattern of one sheet varies depending on the position on the sheet. Further, even a micropattern which is obtained from the same point on the sheet varies when regions from which the micropattern is read have different sizes. Accordingly, an apparatus for making a certificate sheet 10 (which will be referred to as a "certificate-making apparatus") and an apparatus for reading the certificate sheet 10 for use in the PKI application (which will be referred to as a "certificate-using apparatus") must read a micropattern from a reading area with the same shape and the same size located at the same position on the sheet. It can be satisfied simply by fixing the position, shape, and size of the area from which the micropattern 12 is to be read and causing both the certificate-making apparatus and the certificate-using apparatus to read the micropattern from the reading area which is thus fixed.

However, several disadvantages are caused when the reading area of the micropattern 12 is fixed as described above. One disadvantage is that the layout of the printed image on the certificate sheet is limited. Specifically, when the micropattern 12 is read by an optical reading device, the reading area of the micropattern 12 keeps blank. In order to prevent above mentioned disadvantage, it is necessary that the micropattern area on the certificate sheet 10 be left blank and print-free, thereby limiting the layout of the encoded image 14, descriptive text, logos, or the like on the certificate sheet 10.

Another disadvantage caused by fixing the micropattern reading area is that the risk of unauthorized use is increased. Specifically, in a case where the micropattern reading area is fixed, once a person attempting unauthorized use of the certificate sheet obtains information regarding this reading area. The person can reproduce a certificate sheet 10 having the same function as that of the original by reading the micropattern 12 from the original certificate sheet 10 and printing the micropattern 12 on the copied certificate sheet 10.

In order to avoid these adverse effects caused by fixing the micropattern reading area, it is preferable to allow the certificate-making apparatus to determine the reading area of the micropattern 12 on the certificate sheet. An embodiment is illustrated in FIG. 2.

Figure 2:
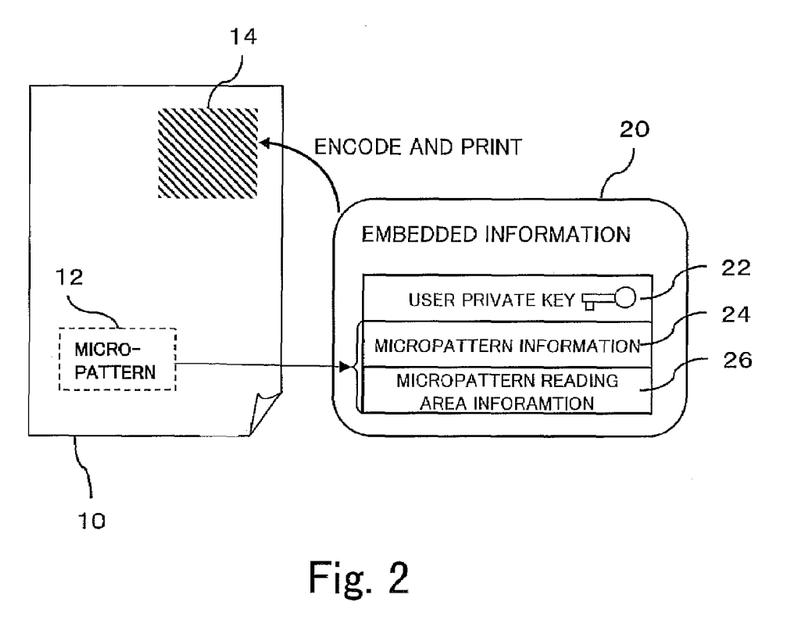
FIG. 2 is a view for explaining another system according to an exemplary embodiment of the present invention.

In FIG. 2, the certificate-making apparatus determines a reading area of the micropattern 12 on an original sheet of a certificate sheet 10. The certificate-making apparatus then encodes embedded information including, in addition to a private key 22 and micropattern information 24, micropattern reading area information 26 indicative of the micropattern reading area, and prints an encoded image 14 on the certificate sheet 10. Here, it is not necessary to determine all the parameters which define the micropattern reading area including the position, shape, size or the like, by the certificate-making apparatus. For example, most of the adverse effects caused by fixing the micropattern reading area can be overcome by simply allowing the certificate-making apparatus to appropriately determine only the position of the micropattern reading area, with the shape and the size thereof being fixed. In this case, the micropattern reading area information 26 corresponds to coordinates showing the position of a reference point in the reading area. When the micropattern reading area has a rectangular shape with a predetermined size, a point at the upper left corner of the rectangle may be used as a reference point. Here, the above structure in which only the position of the reading area is dynamically determined is merely one example. Dynamically determining one or more of the parameters including the position, shape, size, or the like which define the micropattern reading area by the certificate-making apparatus and adding, and the parameters as the micropattern reading area information 26 is included in the encoded image 14.

According to the system shown in FIG. 2, the certificate-using apparatus which uses the certificate sheet 10 can obtain the micropattern reading area information 26 from the encoded image 14 on the certificate sheet 10 which is read, reads the actual micropattern of the certificate sheet 10 from the area on the certificate sheet 10 indicated by the information 26, and then compares the actual micropattern which is read with the micropattern obtained from the encoded image 14.

The system of the present embodiment as described above has a high degree of compatibility with image forming apparatuses, such as a copy machine and a multifunction machine, which are provided with a printing mechanism and an optical reading mechanism, because the optical reading mechanism can be used for reading the micropattern 12 and the printing mechanism can be used for printing the encoded image 14. This substantially eliminates the need for additional hardware when implementing the structure of the present embodiment in such an image forming apparatus.

The function of obtaining the micropattern 12 from an image obtained by reading a sheet, the function of creating the encoded image 14 including information of the micropattern 12, the function of controlling the printing mechanism for printing the encoded image 14 on a sheet, the function of extracting the encoded image 14 from an image obtained by reading the certificate sheet 10 and reproducing the private key 22 and the micropattern information 24, and the like, may be implemented in the form of software or firmware programming. Of course, a part or all of these functions may be implemented in the form of hardware. In any case, an image forming apparatus provided with these functions can be used as an apparatus having both function of the certificate-making apparatus and the certificate-using apparatus described above. An example of an image forming apparatus of the present invention is embodied will be described.

Figure 3:
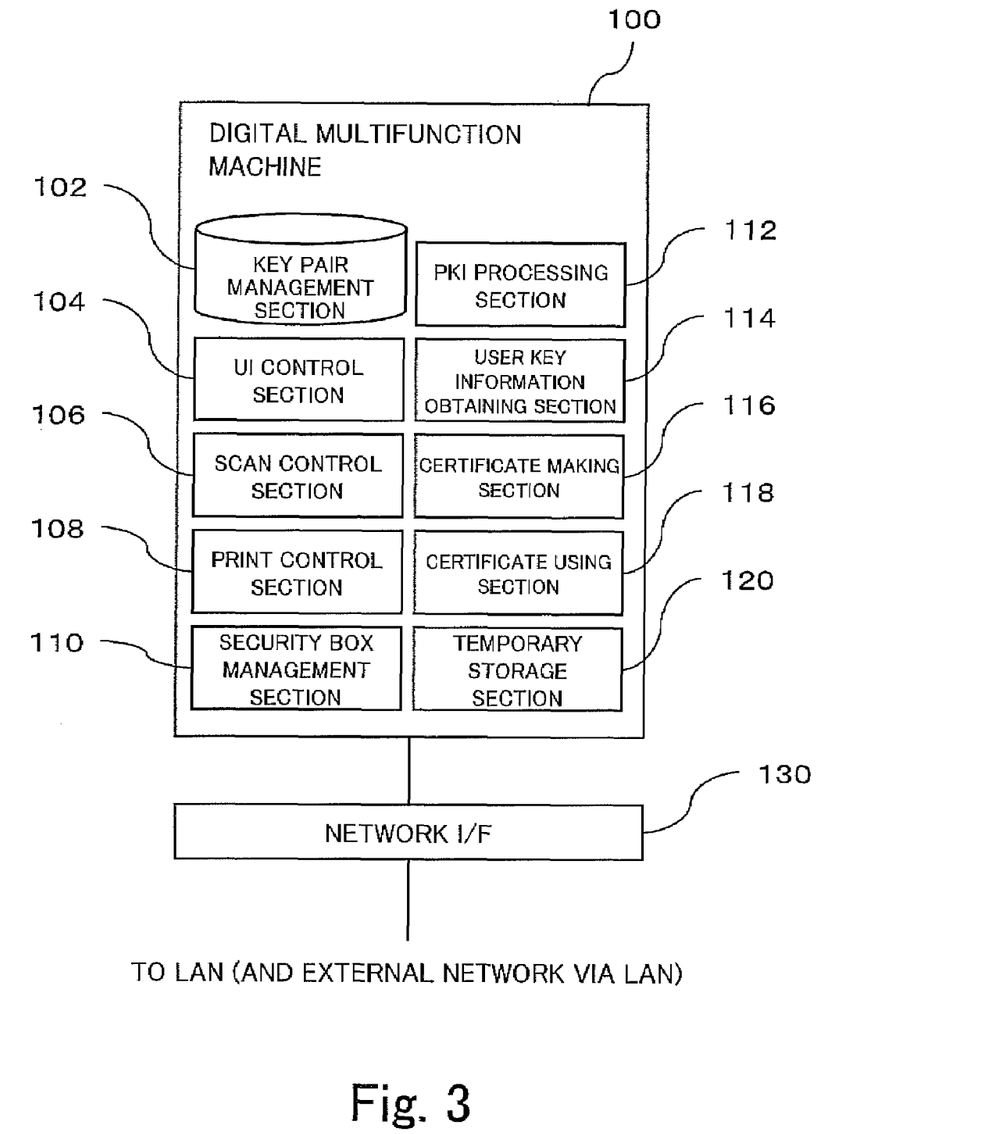
FIG. 3 is a view showing a control mechanism of a digital multifunction machine according to an exemplary embodiment of the present invention.

FIG. 3 is a functional block diagram showing a control mechanism of a digital multifunction machine 100 which is an example of an image forming apparatus according to the present embodiment. The digital multifunction machine 100 has a combined function of a network printer, a network scanner, and a copy machine, and is connected via a network I/F (interface) 130 to an LAN (local area network). The digital multifunction machine 100 may also be connected to an external network such as the Internet via the LAN. FIG. 3 shows a functional structure for control, and not the structural elements of devices such as a printing mechanism and an optical reading mechanism, a touch panel, a CPU, a primary storage, a secondary storage, or the like. Each of the modules 102 to 120 as will be described below can be implemented in the form of programs operating on an OS (operating system) of the digital multifunction apparatus 100.

In the structure shown in FIG. 3, a key pair management section 102 is a functional module which stores a key pair, i.e. a private key and a public key, belonging to the digital multifunction machine 100 itself. In the example described below, while the key pair of the digital multifunction machine 100 is used for encryption of information such as a private key which is to be embedded in the certificate sheet 10 (as will be detailed below), the key pair management section 102 may be eliminated when such encryption is not performed. A UI (user interface) control section 104 is a functional module which performs control of user interface of the digital multifunction machine 100. For example, the UI control section 104 displays a screen on a touch panel provided in the digital multifunction apparatus 100, obtains a user input with respect to a GUI (graphical user interface) such as a menu displayed on the panel, obtains an input from keys or buttons of a hardware provided in the digital multifunction apparatus 100, or performs other processes. A scan control section 106 is a functional module which controls an optical reading mechanism for reading an original document. A print control section 108 is a functional module which controls a printing mechanism for performing printing with respect to a sheet. Here, copying of an original document is achieved by the scan control section 106 and the print control section 108 acting in cooperation. A security box management section 110 is a functional module which manages a storage region exclusively used for an individual user ("security box") which is secured on a storage device of the digital multifunction machine 100. The security box of each user is protected by, for example, limiting access through a user authentication system employing password protection or the like. Such a security box has been used in conventional digital multifunction machines in a such a manner that the security box temporarily stores a scanned image until the user reads out the image from the personal computer on the LAN or temporarily stores print data which is transmitted by a user from the personal computer and the stored data is printed and output upon user authentication (security print function).

A PKI processing section 112 is a functional module which performs a security process in PKI (Public Key Infrastructure). This type of process includes application of digital signature onto data, verification of digital signature applied on data, encryption and decryption of data, and so on. The PKI processing section 112 need not necessarily perform all these processes. Examples of the PKI processing section 112 may be protocols including SSL (Secure Socket Layer) and S/MIME (Secure Multipurpose Internet Mail Extension), but the PKI processing section 112 is not limited to these examples. For example, the PKI processing section 112 is used in such a manner that an image scanned by the digital multifunction machine 100 is registered with digital signature of a user in a document server on LAN or the Internet, or that the scanned image is encrypted using a public key of the document server at the time of such registration.

A user key information obtaining section 114 is a functional module which obtains a user's private key to be embedded in the certificate sheet 10. The private key can be input to the digital multifunction machine 100 via a portable storage medium such as an SD (Secure Digital) memory card (trademark) and a USB (Universal Serial Bus) memory, for example. In this case, it is necessary to provide the digital multifunction machine 100 with a mechanism for reading the portable storage medium. Further, the private key of a user can also be input online to the digital multifunction machine 100 from a computer connected via the network to the digital multifunction machine 100. In this case, it is preferable to encrypt the private key before being transferred to the digital multifunction machine, in order to protect the private key during transmission on the network. Such methods as an SSL and PKCS (Public Key Cryptography Standard) #12 can be used for encryption. When a private key of a user is transferred online from a computer to the digital multifunction machine 100 as described above, security of the information of the user's private key can be enhanced by transferring the private key to the security box of that user in the security box management section 110. By installing a tool for use in secure transfer of a private key to the security box as described above into a user's computer as one function of a device driver of the digital multifunction machine 100, for example, a transfer operation of a private key can be facilitated.

A certificate making section 116 is a functional module which performs control for generating a certificate sheet 10 (i.e. a function of the certificate-making apparatus) which is described above with reference to the principle of the present embodiment (see FIGS. 1 and 2). A certificate using section 118 is a functional module which performs control related to use of the certificate sheet 10 (i.e. a function of the certificate-using apparatus) which is also described above with reference to the principle of the present embodiment. A temporary storage section 120 is a functional module which stores temporary data which is necessary for processing each of the function modules described above.

Figure 4:
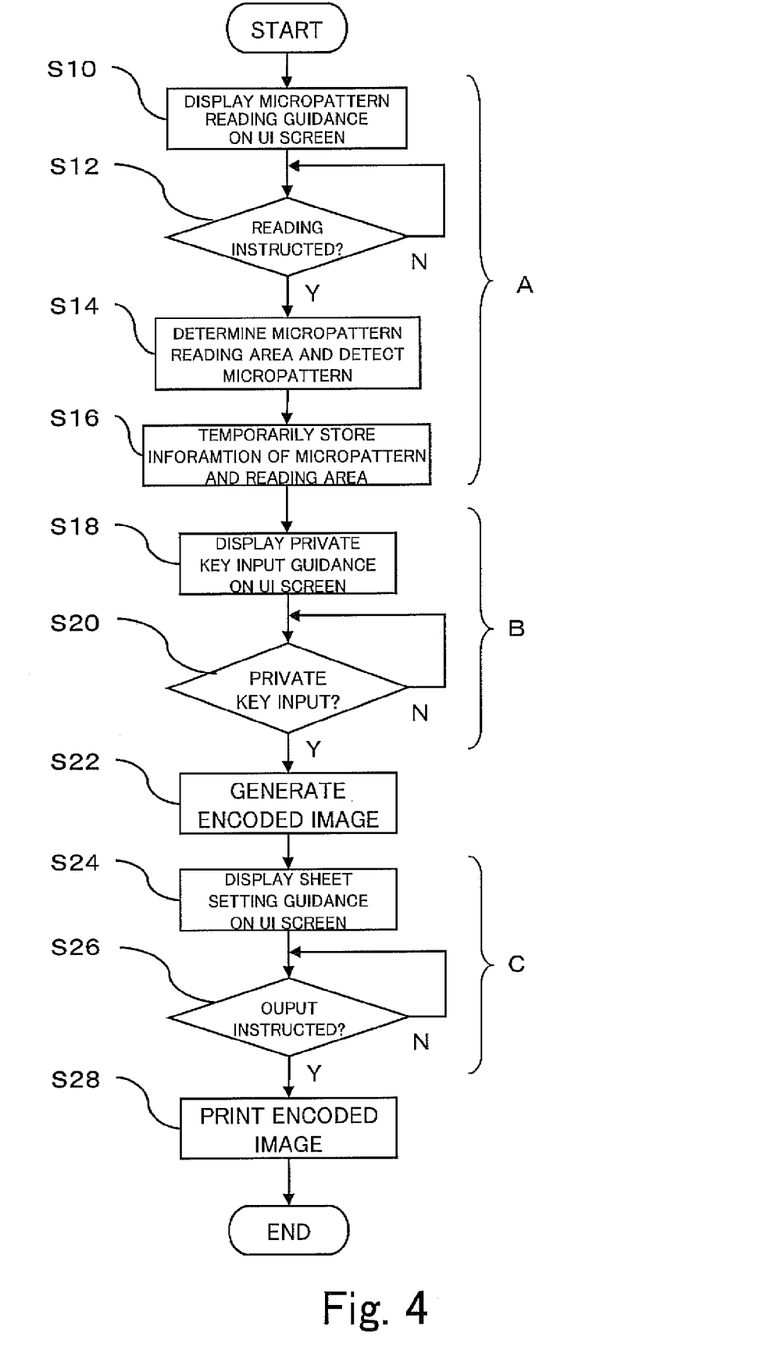
FIG. 4 is a flowchart showing the procedure for making a private key sheet.

As shown in FIG. 4, an example procedure for making a certificate sheet in the digital multifunction machine 100 will be described. This procedure is executed by the certificate making section 116. FIG. 4 illustrates a procedure in which the micropattern reading area shown in FIG. 2 is dynamically determined.

The certificate making function is registered as one item of the operation menu of the digital multifunction machine 100 which is provided by the UI control section 104. Once the certificate making function is selected from the operation menu, the procedure shown in FIG. 4 is executed.

The certificate making section 116 first causes the UI control section 104 to display a guidance screen for micropattern reading, which is used to guide the operation of reading the micropattern. The micropattern reading guidance screen displays guidance message and an explanatory view indicating the direction in which the sheet should be set. Here, the guidance message reads, for example, "Unique information of a sheet is to be read. Prepare a sheet and mark a front surface of the sheet at the upper left corner. Set the sheet on the auto document feeder (or the platen) such that the upper left corner of the front surface is positioned as indicated in the view below, and then press the start button". In this example, the guidance for marking the front surface of the sheet at the upper left corner is made so as to fix the front and back sides and the upper and lower directions of a sheet at the time of setting the sheet. Such guidance is necessary because, when the side or the direction of a set sheet differs between when making a certificate sheet and when using the certificate sheet, micropatterns which are read differ from each other even when the micropatterns are read from the same micropattern reading area of the same sheet. Accordingly, the mark need not necessarily be located on the upper left corner, and may be any mark as long as the side and direction of the sheet can be identified. Here, it is also possible to prepare a sheet for a certificate sheet on which such a mark is previously printed and that the user be guided for proper orientation of the sheet.

After such a guidance screen is displayed, when the user sets a sheet on the document feeder or the platen and instructs reading of the sheet by means of an operation such as pressing the start button of the digital multifunction machine 100 (S12), the certificate making section 116 determines the micropattern reading area, controls the scan control section 106 to obtain an image of the micropattern reading area on the sheet, and obtains the micropattern information 24 from the image (S14). At step S14, an image of the reading area may be read after first determining the micropattern reading area, or to the contrary, an image of the micropattern reading area which is determined may be extracted from an image of the entire sheet which is first scanned. The micropattern reading area may be randomly selected from the region of the sheet other than the region which is previously saved for the encoded image 14 to be printed. In this case, only the position of the micropattern reading area may be determined randomly with the shape and size thereof being previously fixed. The micropattern information 24 may be a representation of the image of the micropattern reading area itself in a predetermined format such as binary data. Alternatively, a characteristic value (or a characteristic vector when a plurality of characteristic values exist) of the micropattern disclosed in Japanese Patent Laid-Open Publication No. 2004-102562 described above may be obtained from the image of the micropattern reading area for use as the micropattern information 24.

The certificate making section 116 temporarily stores the micropattern information 24 and the micropattern reading area information 26 thus obtained in the temporary storage section 120 (S16).

A series of processes at steps S10 to S16 described above correspond to a micropattern reading process A.

Further, the certificate making section 116 causes the UI control section 104 to display a private key input guidance screen (S18). The private key input guidance screen encourages a user to present their private key and displays guidance message which reads, for example, "Transfer the private key to the security box, or set the memory card storing the private key to a card reader. Then, select a way whether the private key is inputted from the security box or the memory card". When the user selects the way on this guidance screen (S20), the certificate making section 116 causes the user key information obtaining section 114 to obtain data of the private key from the security box or the memory card. Here, when the private key is not found in the selected, the certificate making section 116 once again displays a screen for encouraging input of the private key which is similar to the private key input guidance screen.

A series of processes at steps S18 and S20 described above correspond to a private key obtaining process B.

When both the micropattern reading process A and the private key obtaining process B are performed successfully as described above, the certificate making section 116 combines the micropattern information 24, the micropattern reading area information 26, and the private key 22 obtained in both processes A and B in accordance with a predetermined data format to generate the embedded information 20, which is then encoded in accordance with a predetermined encoding method to generate an encoded image 14. Here, various types of existing encoding methods, such as various types of one-dimensional bar codes, various types of two-dimensional bar codes, QR code (trademark), Glyphe code developed by Xerox Cooperation (see Japanese Patent Laid-Open Publication No. Hei 4-334266), or the like, may be used.

While in step 22, the micropattern information 24, the micropattern reading area information 26, and the private key 22 are combined into one piece of embedded information 20 and the embedded information is then encoded, it is of course possible to individually encode each of the information items 22 to 26 and print each encoded information on the certificate sheet 10.

Further, at step S22, it is also preferable to encrypt the entire embedded information 20 or some of the information items 22 to 26 forming the embedded information 20, thereby increasing the confidentiality of the information. For example, higher confidentiality is required for the private key 22 whose security cannot be ensured if the data content is opened to the third person. While a certain degree of security can be secured in the encoded image 14 without encryption once the image is encoded because it is difficult to know the data content indicated by the encoded image 14 unless the algorithm used for encoding is known, security of data can be further enhanced by encrypting the data before encoding. Encryption of the embedded information 20 (or part of it) may be performed by using the public key of the digital multifunction machine 100 which is managed by the key pair management section 102. The encoded image 14 thus encrypted can be decrypted only by the digital multifunction machine 100. Such a structure is sufficient for environment where a single digital multifunction machine 100 is used by several employees.

Further, the certificate making section 116 causes the UI control section 104 to display a sheet setting guidance screen (S24), which encourages a user to set the sheet which the micropattern has been read in the micropattern reading process A onto a feeder tray for example. The sheet setting guidance screen may display message which reads, for example, "Set the sheet which has been read just now onto the feeder tray in such a manner that the mark which is put on the upper left corner on the front surface of the sheet is positioned as shown below, and press the start button", together with an explanatory view indicating the direction of the sheet. After the sheet setting guidance screen is displayed, the start button of the digital multifunction machine 100 is pressed by the user (S26). A series of processes at steps S24 to S26 described above correspond to a sheet setting process C.

When the start button is pressed at step S26, the sheet is transferred to a printing mechanism for printing a certificate sheet image formed by arranging the encoded image 14 in a predetermined layout onto the sheet (S28). With this printing, the certificate sheet 10 is produced.

It should be noted that the procedure shown in FIG. 4 is an example, and the order of each step may be changed. For example, either the micropattern reading process A or the private key obtaining process B may be performed first. Also, the step S22 may be performed at any point after completion of these processes A and B and before execution of the step S28. Further, the sheet setting process C may be performed at any point after the completion of the micropattern reading process A and before execution of the step S28. In addition, either the private key obtaining process B or the sheet setting process C may be performed first as long as other conditions described above are satisfied.

Figure 5:
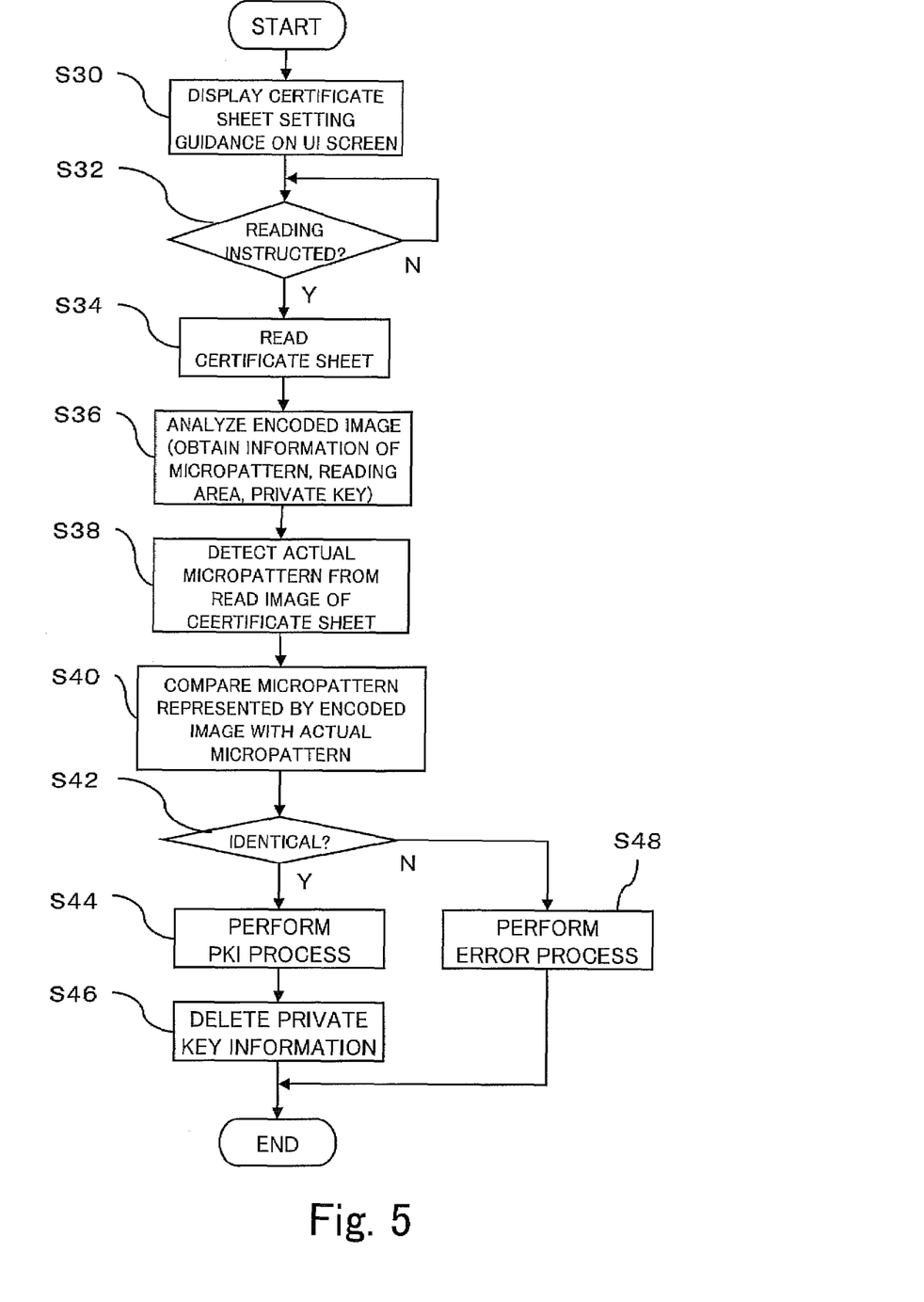
FIG. 5 is a flowchart showing the procedure of a PKI process using a private key sheet.

As shown in FIG. 5, an example procedure of a PKI process using a certificate sheet in the digital multifunction machine 100 will be described.

This procedure is executed by the certificate using section 118. FIG. 5 illustrates the procedure in which the micropattern reading area shown in FIG. 2 is dynamically determined.

Various types of application functions involving the PKI process using the certificate sheet 10 are registered as items of the operation menu of the digital multifunction machine 100 provided by the UI control section 104. These applications include, for example, a function of uploading a scanned document with a user's digital signature to a predetermined document server, a function of decrypting an encrypted electronic mail addressed to a user which is stored in the security box of the digital multifunction machine 100, and so on. When such an application function involving the PKI process is selected from the operation menu, the procedure shown in FIG. 5 is executed.

In this procedure, the certificate using and processing section 118 first causes the UI control section 104 to display a certificate sheet setting guidance screen (S30). The certificate sheet setting guidance screen encourages a user to set the certificate sheet 10 for reading, and may display message which reads, for example, "The process you requested needs submission of a certificate sheet. Please set your certificate sheet onto the auto feeder in the direction as indicated below and press the start button", together with the explanatory view indicating the direction of the certificate sheet 10. The start button is pressed by a user (S32), and the scan control section 106 reads the certificate sheet (S34). When reading is completed, the certificate using section 118 detects the encoded image 14 from the image and decodes the encoded image 14 so as to reproduce data of the private key 22, the micropattern information 24, and the micropattern reading area information 26 (S36). When the private key 22, the micropattern information 24, and/or the micropattern reading area information 26 was encrypted at the time of making the certificate sheet, the data obtained by decoding is further decrypted so as to reproduce the data of the private key 22, the micropattern information 24, and/or the micropattern reading area information 26. For example, in a system which adopts a structure in which encryption is performed using the public key of the digital multifunction machine 100, such data decryption may be performed using the private key of the digital multifunction machine which is managed by the key pair management section 102.

When reproduction of the data of the private key 22, the micropattern information 24, and the micropattern reading area information 26 is completed, the certificate using section 118 then extracts an image of the micropattern reading area defined by the micropattern reading area information 26, and analyzes the area so as to obtain micropattern information (S38). More specifically, the actual micropattern information of the certificate sheet inputted by the user is obtained at step S38. Then, the certificate using section 118 compares the actual micropattern information obtained at step S38 with the micropattern information 24 obtained from the encoded image 14 at step S36 (S40). At this comparison step, whether or not the two sets of micropattern information are identical may be determined using a method disclosed in the related art documents including the above-described Japanese Patent Laid-Open Publication No. 2004-102562 and the like.

When it is determined that these two sets of micropattern information are identical at the comparison step S40 (S42), the certificate using section 118 determines the certificate sheet 10 to be authentic and permits execution of the application function involving the PKI process. Accordingly, the application function is performed. During the execution of this application function, the PKI processing section 112 performs a predetermined PKI process such as digital signature and decryption using the private key 22 obtained at step S36 (S44). When the process of the application function which was requested by the user is complete, the certificate using section 118 deletes the private key 22 obtained at step S36 from the storage device within the digital multifunction machine 100 in order to prevent data leakage of the private key 22.

On the other hand, when it is determined at step S42 that the two sets of micropattern information are not identical, the certificate using section 118 inhibits execution of the application function involving the PKI process, and performs a predetermined error process such as display of error message on the UI screen, and so on (S48).

An embodiment of the present invention has been described. According to the present embodiment, an encoded image 14 including micropattern information 24 of a certificate sheet 10 is printed on the certificate sheet 10, unauthorized use of a copy of the certificate sheet 10 can be detected and inhibited.

Figure 6:
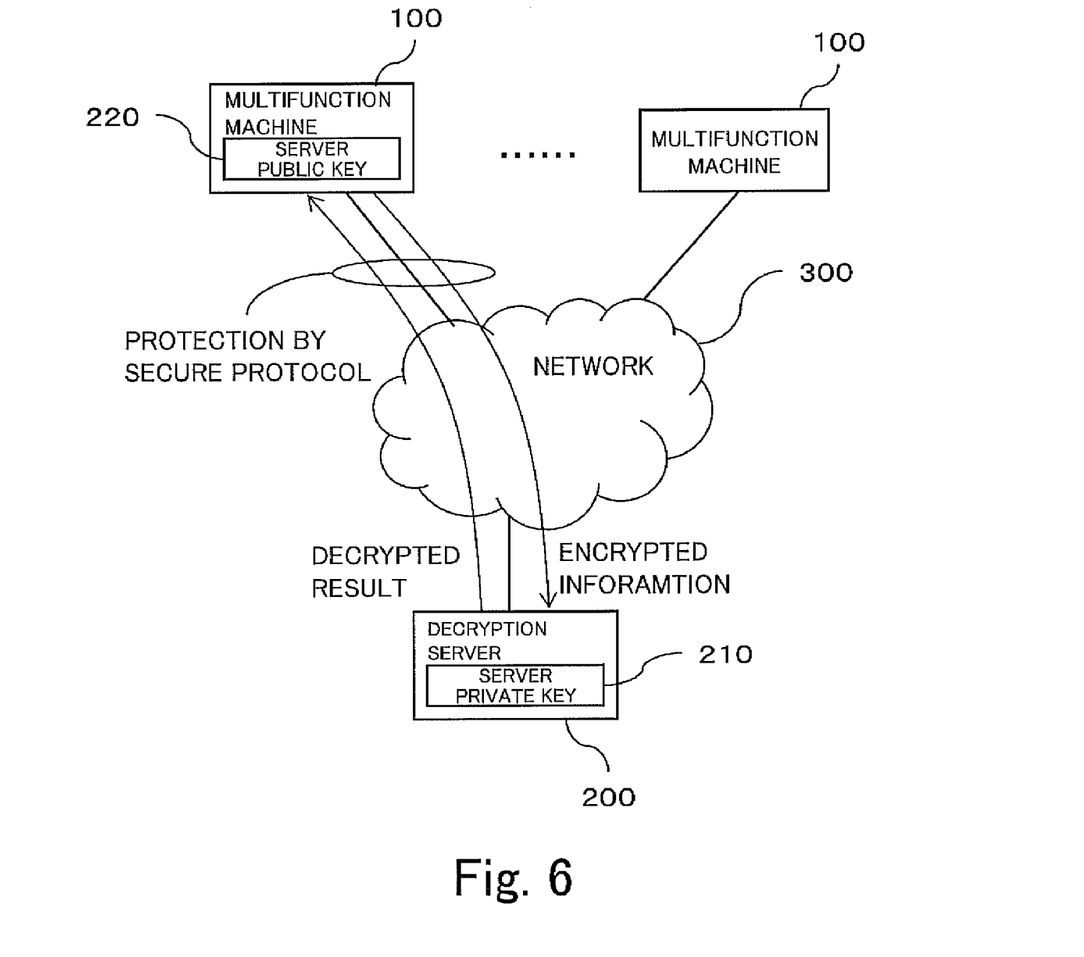
FIG. 6 is a view showing an example system which allows use of a certificate sheet in plural digital multifunction machines.

Here, as shown in FIGS. 3 to 5, the certificate sheet 10 can be used only in the digital multifunction machine 100 because the embedded information on the certificate sheet 10 is encrypted by the public key of the digital multifunction machine 100. A system as shown in FIG. 6 provides a method solving this problem. As shown in FIG. 6, a decryption server 200 is provided on a network 300 such as LAN, to which plural multifunction machines 100 are connected. A public key 220 of the decryption server 200 is shared by these multifunction machines 100. Each multifunction machine 100 encrypts embedded information 20 (or a part of it) using the server public key 220 and forms an encoded image when a certificate sheet 10 is made. When the user submits the certificate sheet 10 to the multifunction machine 100, the multifunction machine 100 decodes the encoded image 14 of the certificate sheet 10 and then sends the embedded information 20 (or a part of it) which has been encrypted, obtained by decoding, to the decryption server 200. The decryption server 200 decrypts the embedded information 20 using its own private key 210 and returns the resulting decrypted value to the multifunction machine 100. By protecting the communication for transmission of a decryption request and return of a decrypted result between the multifunction machine 100 and the decryption server 200 using a secure protocol such as SSL, a risk of leakage of information such as the private key 22 can be reduced. As such, this system allows all the multifunction machines 100 connected to the network 300 to use the certificate sheet 10 which includes the embedded information 20 which is encrypted, regardless of which of the multifunction machines 100 produces the certificate sheet 10.

Further, while in the above embodiment, a user's private key is embedded in the certificate sheet 10, a user's public key and/or a public key certificate may be additionally embedded. When the certificate sheet 10 having the private key and the public key certificate embedded therein is used, an application which is similar to an existing IC card adaptive to PKI can be utilized.

Also, while in the above example a multifunction machine in which the present invention is implemented has been described, the certificate-making apparatus according to the above embodiment may be achieved by combination of a computer and a printer connected to the computer. Such a computer may be configured to execute a program in which the process functions of the certificate-making apparatus as described above are described. Further, the certificate-using apparatus described above may be achieved by a combination of a computer and a scanner connected to the computer, and it is possible to allow a computer so configured to execute a program in which the process functions of the certificate-using apparatus as described above are described. A suitable program for any of the above configurations can typically be provided in a state where the program is recorded on a recording medium readable by the computer, including media such as optical media such as a CD-ROM, DVD-ROM, or the like; magnetic media such as a floppy disk or a hard drive, and so on.

While the embodiments of the present invention have been described using specific terms, such description is for illustrative purposes only, and it is to be understood that changes and variations may be made without departing from the spirit or scope of the appended claims.

The disclosure of Japanese Patent Application No. 2005-057973 filed on Mar. 2, 2005 including the specification, claims, drawings and abstract is incorporated herein by reference in its entirety.

What is claimed is:

1. An image forming apparatus comprising:
a micropattern reading unit that reads a micropattern of a surface of a sheet;
an encoded image generating unit that generates an encoded image, the encoded image having the read micropattern of the surface of the sheet and a private key of a user; and a code printing control unit that prints the encoded image on the sheet having the read micropattern thereon to produce a certificate sheet, the combination of the encoded image and the micropatterns of a surface of the certificate sheet preventing the use of the private key, which is obtained from the encoded image, when the micropatterns obtained from the encoded image are not identical to the micropatterns obtained by reading the certificate sheet with a micropattern reading unit.

2. The image forming apparatus according to claim 1, wherein said micropattern reading unit dynamically determines a reading area of the micropattern on the sheet and reads the micropattern; and
said encoded image generating unit generates the encoded image and the encoded image further has information of the reading area.

3. The image forming apparatus according to claim 1, wherein said encoded image generating unit generates the encoded image and the encoded image further has information of a public key associated with the user.

4. The image forming apparatus according to claim 1, further comprising:
an encoded image analyzing unit that analyzes the encoded image on the certificate sheet to obtain the micropattern of a surface of the certificate sheet and the private key of the user; and
a key use control unit that compares the micropattern of the surface of the certificate sheet obtained by the encoded image analyzing unit with the micropattern of the certificate sheet;
wherein said key use control unit prohibits use of a private key obtained from the encoded image when the micropatterns are determined to be not identical, and permits use of a private key obtained from the encoded image when the micropatterns are determined to be identical.

5. The image forming apparatus according to claim 4, wherein said encoded image generating unit encrypts information of the micropattern of the surface of the certificate sheet and the private key and generates the encoded image from an encrypted result; and
said encoded image analyzing unit decrypts an analyzed result of the encoded image to obtain the micropattern of the surface of the certificate sheet and the private key.

6. An image forming apparatus comprising:
an encoded image analyzing unit that analyzes an encoded image printed on a certificate sheet to obtain a micropattern of a surface of the certificate sheet and a private key of a user represented by the encoded image;
a micropattern reading unit that reads the certificate sheet to obtain a micropattern of the certificate sheet; and
a key use control unit that compares the micropattern of the surface of the certificate sheet obtained by the encoded image analyzing unit from the encoded image with the micropattern of the certificate sheet which is read by an actual micropattern reading unit; wherein using a private key obtained from the encoded image is prohibited when the micropatterns are determined to be not identical, and using a private key obtained from the encoded image is permitted when the micropatterns are determined to be identical.

7. The image forming apparatus according to claim 6, wherein said encoded image analyzing unit further obtains micropattern reading area information from the encoded image; and
said micropattern reading unit obtains the micropattern of the surface of the certificate sheet from the micropattern reading area information.

8. A method of making a certificate sheet comprising:
reading a micropattern of a surface of a sheet;
generating an encoded image, the encoded image having the read micropattern of the surface of the sheet and a private key of a user; and
printing the encoded image on the sheet having the read micropattern thereon to produce a certificate sheet, the combination of the encoded image and the micropatterns of a surface of the certificate sheet preventing the use of the private key, which is obtained from the encoded image, when the micropatterns obtained from the encoded image are not identical to the micropatterns obtained by reading the certificate sheet with a micropattern reading unit.

9. The method according to claim 8, wherein a reading area of the micropattern on the sheet is dynamically determined and the micropattern is read from an image in the reading area; and
an encoded image which further includes reading area information representing the reading area is generated as the encoded image.

10. The method according to claim 8, wherein an encoded image which further includes information of a public key of the user is generated as the encoded image.

11. The method according to claim 8, further comprising:
analyzing the encoded image printed on the certificate sheet to obtain the micropattern of the surface of the certificate sheet and the private key of the user represented by the encoded image;
reading the certificate sheet to obtain a micropattern of the certificate sheet; and comparing the micropattern of the surface of the certificate sheet obtained from the encoded image with the micropattern of the surface of the certificate sheet, wherein using a private key obtained from the encoded image is prohibited when the micropatterns which are determined to be not identical, and using of a private key obtained from the encoded image is permitted when the micropatterns which are determined to be identical.

12. The method according to claim 11, wherein information of the micropattern of the surface of the certificate sheet and the private key is encrypted and the encoded image is generated from an encrypted result; and
an analyzed result of the encoded image is decrypted to obtain the micropattern of the surface of the certificate sheet and the private key.

13. A method of reading and processing a certificate sheet comprising:
reading and electronically analyzing an encoded image printed on a certificate sheet to obtain a micropattern of a surface of the certificate sheet and a private key of a user represented by the encoded image;

reading the certificate sheet to obtain a micropattern of a surface of the certificate sheet; and electronically comparing the micropattern of the surface of the certificate sheet obtained from the encoded image with the micropattern of the surface of the certificate sheet, wherein using a private key obtained from the encoded image is prohibited when the micropatterns are determined to be not identical, and using a private key obtained from the encoded image is permitted when the micropatterns are determined to be identical.

14. The method according to claim 13, wherein micropattern reading area information is further obtained from the encoded image; and the micropattern is obtained from the micropattern reading area information.

15. A storage medium readable by a computer, the storage medium storing a program of instructions executable by the computer to perform a function for making a certificate sheet, the function comprising:

reading a micropattern of a surface of a sheet;

generating an encoded image, the encoded image having the read micropattern of the surface of the sheet and a private key of a user; and printing the encoded image on the sheet having the read micropattern thereon to produce a certificate sheet, the combination of the encoded image and the micropatterns of a surface of the certificate sheet preventing the use of the private key, which is obtained from the encoded image, when the micropatterns obtained from the encoded image are not identical to the micropatterns obtained by reading the certificate sheet with a micropattern reading unit.

16. The storage medium according to claim 15, wherein a reading area of the micropattern on the sheet is dynamically determined and the micropattern is read from an image in the reading area; and an encoded image which further includes reading area information representing the reading area is generated as the encoded image.

17. The storage medium according to claim 15, wherein an encoded image which further includes information of a public key of the user is generated as the encoded image.

18. The storage medium according to claim 15, further comprising:

analyzing the encoded image printed on the certificate sheet to obtain the micropattern of a surface of the certificate sheet and the private key of the user represented by the encoded image;

reading the certificate sheet to obtain an micropattern of the certificate sheet; and comparing the micropattern of the surface of the certificate sheet obtained from the encoded image with the micropattern of the surface of the certificate sheet, wherein using a private key obtained from the encoded image is prohibited when the micropatterns which are determined to be not identical, and using of a private key obtained from the encoded image is permitted when the micropatterns which are determined to be identical.

19. The storage medium according to claim 15, wherein information of the micropattern of a surface of the certificate sheet and the private key is encrypted and the encoded image is generated from an encrypted result; and an analyzed result of the encoded image is decrypted to obtain the micropattern of the surface of the certificate sheet and the private key.

20. A method for making a certificate sheet, comprising:

reading a micropattern of a surface of a sheet;

generating an encoded image; and printing the encoded image on the sheet to produce the certificate sheet, wherein the encoded image has a private key of a user, information corresponding to the read micropattern of the surface of the sheet, and information corresponding to a reading area of the read micropattern of the surface of the sheet, the combination of the encoded image and the micropatterns of a surface of the certificate sheet preventing the use of the private key, which is obtained from the encoded image, when the micropatterns obtained from the encoded image are not identical to the micropatterns obtained by reading the certificate sheet with a micropattern reading unit.

* * * * *